US012679221B2

(12) United States Patent
Poetter

(10) Patent No.: US 12,679,221 B2
(45) Date of Patent: Jul. 14, 2026

(54) METHOD FOR CONTROLLING AN ELECTRIC MOTOR OF A BATTERY-OPERATED ELECTRIC VEHICLE, BATTERY-OPERATED ELECTRIC VEHICLE AND A CONTROL DEVICE FOR A BATTERY-OPERATED ELECTRIC VEHICLE

(71) Applicant: Bayerische Motoren Werke Aktiengesellschaft, Munich (DE)

(72) Inventor: Felix Poetter, Alling (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 91 days.

(21) Appl. No.: 18/700,108

(22) PCT Filed: Sep. 20, 2022

(86) PCT No.: PCT/EP2022/076123
§ 371 (c)(1),
(2) Date: Apr. 10, 2024

(87) PCT Pub. No.: WO2023/083516
PCT Pub. Date: May 19, 2023

(65) Prior Publication Data
US 2025/0229647 A1    Jul. 17, 2025

(30) Foreign Application Priority Data
Nov. 10, 2021    (DE) ..................... 10 2021 129 267.0

(51) Int. Cl.
B60L 15/20        (2006.01)
H02P 23/04        (2006.01)

(52) U.S. Cl.
CPC .......... B60L 15/2072 (2013.01); H02P 23/04 (2013.01); B60L 2240/12 (2013.01); B60L 2240/423 (2013.01); B60L 2240/465 (2013.01)

(58) Field of Classification Search
CPC ............ B60L 15/2072; B60L 2240/12; B60L 2240/423; B60L 2240/465; B60L 15/20;
(Continued)

(56) References Cited

U.S. PATENT DOCUMENTS

2021/0078577 A1    3/2021    Roques et al.

FOREIGN PATENT DOCUMENTS

DE    10 2014 219 769 A1    3/2016
DE    10 2015 224 722 A1    6/2017
DE    10 2019 111 913 A1    11/2020

OTHER PUBLICATIONS

Machine translation of DE 102019111913 (Year: 2019).*
(Continued)

*Primary Examiner* — Alan D Hutchinson
(74) *Attorney, Agent, or Firm* — Crowell & Moring LLP

(57) ABSTRACT

A method for controlling an electric motor of a battery-operated electric vehicle (BEV) includes receiving a signal for activating a drive slip control function for a braked start at full load of the BEV, supplying the electric motor with a predefined basic application of current while the BEV is in a braked state, and releasing a vibration mode by exciting the electric motor corresponding to a predetermined excitation scheme in addition to the predefined basic application of current. A battery-operated electric vehicle and a control device for a battery-operated electric vehicle are also disclosed.

20 Claims, 1 Drawing Sheet

(58) Field of Classification Search
CPC .............. H02P 23/04; B60W 2540/10; B60W
2540/12; B60W 10/08; B60W 30/18027;
B60W 50/16
See application file for complete search history.

(56) References Cited

OTHER PUBLICATIONS

Machine translation of DE 102015224722 (Year: 2015).*
International Search Report (PCT/ISA/210) issued in PCT Application No. PCT/EP2022/076123 dated Feb. 2, 2023 with English translation (5 pages).
German-language Written Opinion (PCT/ISA/237) issued in PCT Application No. PCT/EP2022/076123 dated Feb. 2, 2023 with English translation (13 pages).
German-language Search Report issued in German Application No. 10 2021 129 267.0 dated Aug. 25, 2022 with partial English translation (12 pages).

* cited by examiner

METHOD FOR CONTROLLING AN ELECTRIC MOTOR OF A BATTERY-OPERATED ELECTRIC VEHICLE, BATTERY-OPERATED ELECTRIC VEHICLE AND A CONTROL DEVICE FOR A BATTERY-OPERATED ELECTRIC VEHICLE

BACKGROUND AND SUMMARY

The present invention relates to a method for controlling an electric motor of a battery-operated electric vehicle, to a battery-operated electric vehicle, and to a control device for a battery-operated electric vehicle.

PRIOR ART

Battery-operated electric vehicles (BEV, battery electric vehicle), that is to say, vehicles without an internal combustion engine, which are driven merely by a battery which can be charged at a charging station or socket via a power supply system, are becoming ever more popular because of increasing environmental awareness and also increasing fuel costs. They also provide the driver and the occupants with a pleasant driving sensation since they can be accelerated rapidly because of being driven by an electric motor. In addition, BEVs are substantially less noisy than vehicles with conventional internal combustion engines and are virtually free from vibrations, for example during acceleration.

However, many a driver would like the sensation of sitting in a vehicle with an internal combustion engine and would like not to miss out on controlling such a vehicle, especially of experiencing the internal combustion engine.

For example, a function known from the prior art for assisting what is referred to as a "racing start", i.e. starting at full load with brake and gas pedal simultaneously actuated, is known. The function which is known as 'launch control' and constitutes a form of drive slip control ensures, by controlling the rotational speed of the wheels during starting, an optimum degree of slip from a standstill for optimized starting at full load. In the meantime, the launch control is provided not only for vehicles with internal combustion engines, but also for electric vehicles.

However, such a racing start has hitherto been relatively unspectacular for the driver of a BEV since, in contrast to internal combustion engines, the electric motor is completely at a standstill immediately before the racing start since BEVs do not have idling because of their drive in the form of electric motors. The result for the BEV driver wanting to carry out braked starting in the racing start using the launch control is that, although the electric motor is activated at the same time as the actuation of gas and brake required for this purpose and moving off is prevented by the brake, the absence of rotational speed idling and therefore also the absence of vibrations of the bodywork mean that the driver does not experience this.

This missing staging of a racing start by a BEV may also constitute a lack of driving sensation for the driver.

Therefore, it is an object of the present invention to eliminate the abovementioned deficiencies of BEVs in a simple and efficient way.

This object is achieved according to the invention by a method for controlling an electric motor of a battery-operated electric vehicle having the features according to the present disclosure, a battery-operated electric vehicle having the features according to the present disclosure, and a control device for a battery-operated electric vehicle having the features according to the present disclosure. Preferred embodiments and developments of the invention are also specified in the present disclosure.

Accordingly, the invention provides a method for controlling an electric motor of a battery-operated electric vehicle, BEV, wherein the method comprises the following steps receiving a signal for activating a drive slip control function for a braked start at full load of the BEV, supplying the electric motor with a predefined basic application of current while the BEV is in a braked state, and triggering a vibration mode by excitation of the electric motor in accordance with a predefined excitation scheme in addition to the predefined basic application of current.

The method according to the invention firstly makes bracing of the drive train counter to the holding torque in the braked state noticeable for the driver by the fact that the vehicle body is slightly lowered when the predefined basic application of current with simultaneous braking is applied. Furthermore, by provision of the corresponding excitation scheme, vibration is generated in the vehicle in a simple and efficient way by the fact that the vehicle body is braced to differing extents by a pulsating signal counter to the braking force in the phase before the start in the form of a racing start or braked starting at full load. The fully braked vehicle vibrates at a standstill, similarly to a vehicle with an internal combustion engine at idling rotational speeds, and provides the driver with driving feedback which makes the driver aware firstly of the current or imminent driving situation, namely that the vehicle will start in a few seconds with very high acceleration. Secondly, the vibration and therefore the driving feedback also leads to a greater thrill and driving pleasure or emotional state for the driver. The driver can, as it were, experience the force of the electric motor, although the BEV is braked and at a standstill, by this artificial staging in the form of the vibration mode since the bracing of the vehicle body counter to the braking force has the effect of a slight movement/vibration of the bodywork.

It is noted that the drive slip control is a launch control function for a braked start at full load for a maximum starting speed. This driver assistance system is available for electric vehicles. The launch control is preferably activated by simultaneous actuation of the brake and of the gas pedal. The aim of the launch control, as already mentioned above, is to prepare or preload the vehicle to starting at full load or a racing start that is then imminent in a few seconds.

According to a preferred embodiment of the invention, the predefined excitation scheme comprises an oscillating electric driving torque, the effective value of which does not make any contribution to propelling the BEV.

According to a further preferred embodiment of the invention, the effective value of the oscillating electric excitation torque lies above a predetermined threshold value, in particular above a motor torque of 80 Nm. The provision of a lower threshold value ensures that the vibration triggered by the pulsating excitation is also of sufficient strength and is clearly noticeable by the driver of the vehicle and possibly other occupants.

The clearly noticeable vibration, as mentioned above, firstly excites the awareness of the driver for adjusting to the current driving situation, for example to the imminent racing start, and secondly the driving pleasure and emotional state of the driver can thereby be enhanced. A clearly noticeable vibration when the vehicle is at a standstill may, however, also serve, for example, to make the driver aware of a traffic light switching to green.

According to a further preferred embodiment of the invention, the oscillating electric driving torque lies in a frequency range of 10 Hz to 30 Hz, in particular at approx. 15 Hz. By this, a clearly noticeable vibration of the vehicle body can be generated for the driver.

According to yet another preferred embodiment of the invention, the predefined basic application of current lies in a range of 40 A to 140 A, in particular at approx. 80 A. With simultaneous braking, the vehicle bodywork is therefore significantly lowered and prepares the driver for the imminent racing start. It is noted that the amount of basic application of current is dependent on the electric motor which is installed in the BEV. In general, the basic application of current is higher in larger electric motors than in smaller electric motors.

The method according to one of the preceding claims, wherein the predefined excitation scheme comprises pulsating excitation with a change between high and low currents, wherein the amplitude lies in a range of 60 amperes to 160 amperes.

By the pulsating signal or the pulsating excitation of the electric motor, the vehicle body, as mentioned above, is braced to differing extents counter to the braking force and, as a result, the desired vibrations of the vehicle bodywork for the above-mentioned purposes are triggered.

In order to assist this further, it is possible additionally to stage a motor noise such that the driver and the possible other occupants 1. obtain further feedback regarding the applied motor force, and
2. have the sensation of sitting in a vehicle with a drive motor (possibly also internal combustion engine) with an individual sound.

Preferably, the vibration mode can be deactivated. The deactivation function is advantageous since there may be situations in which the vibration mode is not desired and instead quiet and vibration-free travel, typical of electric vehicles, is preferred.

Furthermore, according to the invention, a battery-operated electric vehicle, BEV, which has a control device which is configured to carry out the above-described method, is provided.

Furthermore, according to the invention, a control device for a battery-operated electric vehicle, BEV, is provided, wherein the control device is configured to carry out the above-described method.

Further details, features and advantages of the invention emerge from the description below and the drawings.

DETAILED DESCRIPTION OF THE DRAWINGS

Figure 1:
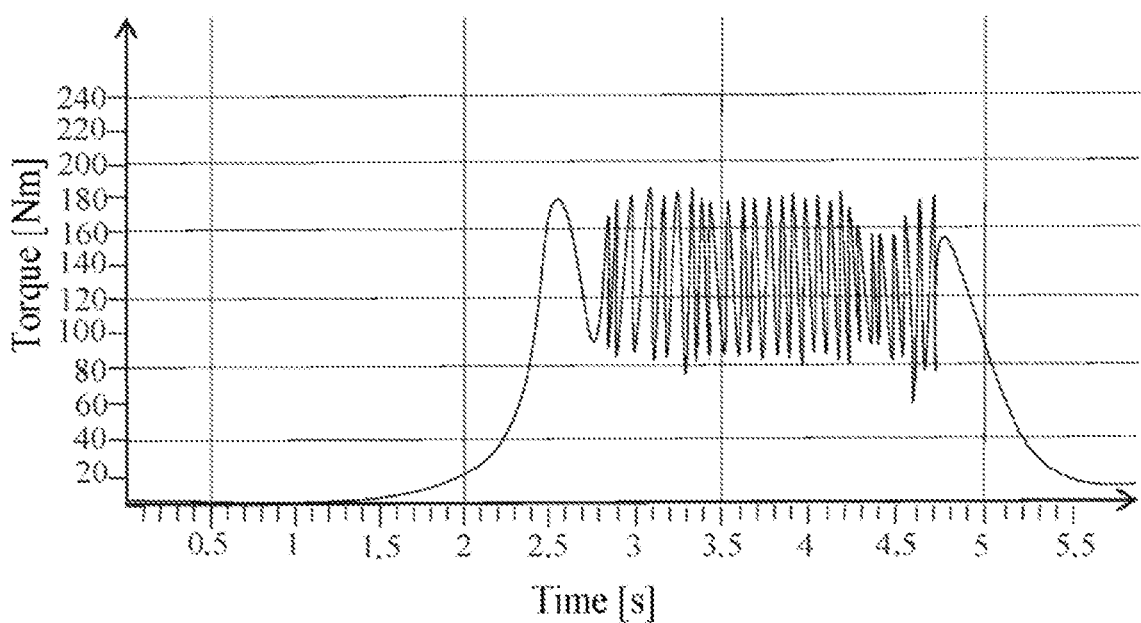
FIG. 1 shows an excitation scheme for staging a racing start according to an embodiment of the present disclosure.

FIG. 1 shows an excitation scheme for staging a racing start according to an embodiment of the present disclosure. In this situation, the launch control of the BEV which in this case has both a brake pedal and a gas pedal, but not a clutch, is triggered by simultaneous actuation of the brake and the gas pedal. The electric motor here of the BEV is supplied with a predefined basic application of current, for example with approx. 80 A, such that the vehicle body is lowered during simultaneous braking.

At the same time, the vibration mode, in which the electric motor or the electric motors, in the case in which the BEV has two electric motors, is/are excited in accordance with a predefined excitation scheme, is also triggered here.

The diagram of FIG. 1 shows the torque of an electric motor of a BEV for the above-described racing start situation, wherein the torque has been plotted in Nm on the Y axis and the time in s on the X axis. The illustration is purely schematic since the plotted values, as already explained above, depend on the electric motor itself.

As can be seen in the figure, the excitation scheme comprises the provision of an oscillating electric driving torque which, in the exemplary embodiment illustrated here, lies above 80 Nm.

Furthermore, it can be seen that the amplitude between the high and low torques, which can lie in a range of 50 Nm to 200 Nm, is approximately 80 to 100 Nm in the exemplary embodiment illustrated here.

As already explained, the effective value of the excitation power does not, however, contribute to the propelling of the BEV. On the contrary, the oscillating excitation with currents of differing magnitude means that the vehicle body is braced to differing degrees counter to the braking force. Although the vehicle is at a standstill and braked to provide the racing start, the driver thereby now experiences the force of the electric motor since the bracing counter to the braking force has the effect of a slight movement or vibration of the bodywork.

Figure 2:
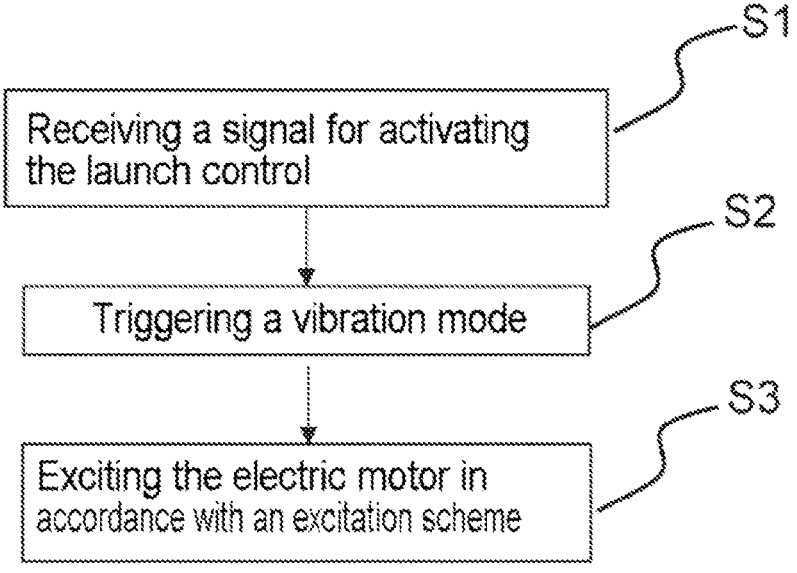
FIG. 2 shows a flow diagram with the method steps for controlling an electric motor for a racing start according to an embodiment of the present disclosure.

FIG. 2 is a flow diagram comprising the method steps for controlling an electric motor of a BEV for a racing start according to an embodiment of the present disclosure. By simultaneous actuation of the brake pedal and the gas pedal, a corresponding signal for activating the launch control is received by a control device of the BEV in a first step S1. In a second step S2, upon receipt of the signal, the vibration mode is triggered in accordance with the excitation scheme usable for this purpose and illustrated by way of example in FIG. 1. The electric motor is excited here in a third step S3 in accordance with the excitation scheme with an oscillating electric excitation power, the effective value of which does not contribute to propelling the BEV.

What is claimed is:

1. A method for controlling an electric motor of a battery-operated electric vehicle (BEV), the method comprising:
   receiving a signal for activating a drive slip control function for a braked start at full load of the BEV;
   supplying the electric motor with a predefined basic application of current while the BEV is in a braked state, wherein a body of the BEV is caused to be lowered in response to the predefined basic application of current; and
   triggering a vibration mode of the body of the BEV by excitation of the electric motor in accordance with a predefined excitation scheme in addition to the predefined basic application of current.

2. The method according to claim 1, wherein the predefined excitation scheme comprises an oscillating electric driving torque, an effective value of which does not make contribution to propelling the BEV.

3. The method according to claim 2, wherein the effective value of the oscillating electric driving torque lies above a predetermined threshold value, which is above a motor torque of 50 Nm.

4. The method according to claim 2, wherein the oscillating electric driving torque lies in a frequency range of 10 Hz to 300 Hz.

5. The method according to claim 1, wherein the predefined basic application of current lies in a range of 40 A to 140 A.

6. The method according to claim 1, wherein the predefined excitation scheme comprises pulsating excitation with a change between high and low currents, wherein an amplitude lies in a range of 20 Nm to 200 Nm.

7. The method according to claim 1, comprising:
deactivating the vibration mode.

8. A battery-operated electric vehicle (BEV) comprising:
a controller configured to:
  receive a signal for activating a drive slip control function for a braked start at full load of the BEV;
  supply an electric motor of the BEV with a predefined basic application of current while the BEV is in a braked state, wherein a body of the BEV is configured to be lowered in response to the predefined basic application of current; and
  trigger a vibration mode of the body of the BEV by excitation of the electric motor in accordance with a predefined excitation scheme in addition to the predefined basic application of current.

9. The BEV according to claim 8, wherein the predefined excitation scheme comprises an oscillating electric driving torque, an effective value of which does not make contribution to propelling the BEV.

10. The BEV according to claim 9, wherein the effective value of the oscillating electric driving torque lies above a predetermined threshold value, which is above a motor torque of 50 Nm.

11. The BEV according to claim 9, wherein the oscillating electric driving torque lies in a frequency range of 10 Hz to 300 Hz.

12. The BEV according to claim 8, wherein the predefined basic application of current lies in a range of 40 A to 140 A.

13. The BEV according to claim 8, wherein the controller is configured to:
  trigger the vibration mode by excitation of the electric motor in accordance with the predefined excitation scheme by triggering a pulsating excitation with a change between high and low currents, wherein an amplitude lies in a range of 20 Nm to 200 Nm.

14. The BEV according to claim 8, wherein the controller is configured to:
  deactivate the vibration mode.

15. A controller for a battery-operated electric vehicle (BEV), wherein the controller is configured to:
  receive a signal for activating a drive slip control function for a braked start at full load of the BEV;
  supply an electric motor of the BEV with a predefined basic application of current while the BEV is in a braked state, wherein the controller is configured to cause a body of the BEV to be lowered in response to the predefined basic application of current; and
  trigger a vibration mode of the body of the BEV by excitation of the electric motor in accordance with a predefined excitation scheme in addition to the predefined basic application of current.

16. The controller according to claim 15, wherein the predefined excitation scheme comprises an oscillating electric driving torque, an effective value of which does not make contribution to propelling the BEV.

17. The controller according to claim 16, wherein the effective value of the oscillating electric driving torque lies above a predetermined threshold value, which is above a motor torque of 50 Nm.

18. The controller according to claim 16, wherein the oscillating electric driving torque lies in a frequency range of 10 Hz to 300 Hz.

19. The controller according to claim 15, wherein the predefined basic application of current lies in a range of 40 A to 140 A.

20. The controller according to claim 15, configured to:
  trigger the vibration mode by excitation of the electric motor in accordance with the predefined excitation scheme by triggering a pulsating excitation with a change between high and low currents, wherein an amplitude lies in a range of 20 Nm to 200 Nm.

* * * * *